United States Patent [19]

Fukuda et al.

[11] 4,176,782

[45] Dec. 4, 1979

[54] CONTACTLESS DIGITAL KEY SWITCH

[75] Inventors: Hiroshi Fukuda, Tokyo; Haruo Matsuzaka, Yokohama, both of Japan

[73] Assignee: Matsu Kyu Kabushiki Kaisha, Tokyo, Japan

[21] Appl. No.: 911,512

[22] Filed: Jun. 1, 1978

[30] Foreign Application Priority Data

Jun. 3, 1977 [JP] Japan ............................ 52-72394[U]

[51] Int. Cl.$^2$ ........................ G06K 7/08; E05B 43/00; E05B 35/00; G06K 19/06
[52] U.S. Cl. .................................... 235/449; 70/271; 70/336; 235/493
[58] Field of Search ............... 235/382, 449, 450, 493; 200/46, 12; 70/271, 336

[56] References Cited

U.S. PATENT DOCUMENTS

| | | | |
|---|---|---|---|
| 3,154,761 | 10/1964 | O'Gorman | 235/493 |
| 3,215,903 | 11/1965 | Barney | 235/493 |
| 3,789,193 | 1/1974 | Bremner | 235/449 |
| 3,926,021 | 12/1975 | Genest et al. | 235/493 |
| 3,953,712 | 4/1976 | Horvath | 235/449 |
| 4,134,539 | 1/1979 | Hopkinson | 235/449 |

Primary Examiner—Daryl W. Cook
Attorney, Agent, or Firm—Haseltine, Lake & Waters

[57] ABSTRACT

A contactless digital key switch is provided which comprises a plurality of printed circuit substrates each having a predetermined number of magnetic sensor chips longitudinally arranged thereon in spaced relation, the printed circuit substrates disposed in the form of polygon prism with the magnetic sensor chips facing inwardly, an actuating key member having one or more permanent magnets longitudinally arranged therein in spaced relation and in coded form, a rotary member adapted to receive the actuating key member and rotate with the same within the polygon prism defined by the printed circuit substrates, and means drivingly connected to the rotary member for permitting rotation of the rotary member with a snap action and holding the rotary member in a position where the permanent magnets face to the corresponding magnetic sensor chips on one of the printed circuit substrates every time the rotary member is rotated by a predetermined angle, whereby a coded signal corresponding to the permanent magnets arranged in coded form can be provided every time the actuating key member is rotated by the predetermined angle.

3 Claims, 3 Drawing Figures

CONTACTLESS DIGITAL KEY SWITCH

BACKGROUND OF THE INVENTION

1. Field of the Invention

The invention relates to a digital key switch and, more particularly, to a contactless digital key switch capable of establishing a number of closed circuits simply by key operation.

2. Description of the Prior Art

Digital key switches are well-known in the art which involve microswitches and a key member for mechanically actuating the microswitches through cams by key operation, but such prior key switches have had numerous disadvantages resulting from mechanically operated microswitches. First, such switches is extensive, low in reliability and high in cost for maintenance. Second, there are serious limitations on the number of closed circuits possible to be established. Third, there is a tendency of the position of the microswitches and cams to shift in use so as to cause malfunction. Fourth, such prior switches are likely to be operated by counterfeited keys which are easily obtained in today's market place.

SUMMARY OF THE INVENTION

It is therefore an object of the present invention is to provide a contactless key switch which will be compact, high in reliability, and long in service life.

Another object of the present invention is to provide an improved key switch which can establish an increased number of closed circuits.

A further object of the present invention is to provide an improved key switch which can eliminate or reduce the possibility of the switch mechanism from being operated by a counterfieted key.

These and other objects are accomplished in accordance with the present invention by providing a contactless digital key switch which comprises a plurality of printed circuit substrates each having a predetermined number of magnetic sensor chips longitudinally arranged thereon in spaced relation, the printed circuit substrates disposed in the form of polygon prism with the magnetic sensor chips facing inwardly, and an actuating key member having one or more permanent magnets longitudinally arranged therein in spaced relation and in coded form. Within the polygon prism defined by the printed circuit substrates there is provided a rotary member which is adapted to receive the actuating key member and is rotatable with the same so that the permanent magnets of the actuating key member can sequently face to the magnetic sensor chips on the respective printed circuit substrates to provide a coded output signal for every printed circuit substrate. Additionally provided is means drivingly connected to the rotary member for permitting rotation of the rotary member with a snap action and holding the rotary member in a position where the permanent magnets face to the corresponding magnetic sensor chips on one of the printed circuit substrates every time the rotary member is rotated by a predetermined angle.

Other objects and advantages of the present invention will become more apparent from the detailed description of the preferred embodiment which follow.

BRIEF DESCRIPTION OF THE DRAWINGS

In the detailed description of the preferred embodiment presented below, reference is made to the accompanying drawings wherein corresponding parts are identified by like numerals and in which.

DESCRIPTION OF THE PREFERRED EMBODIMENT

Figure 1:
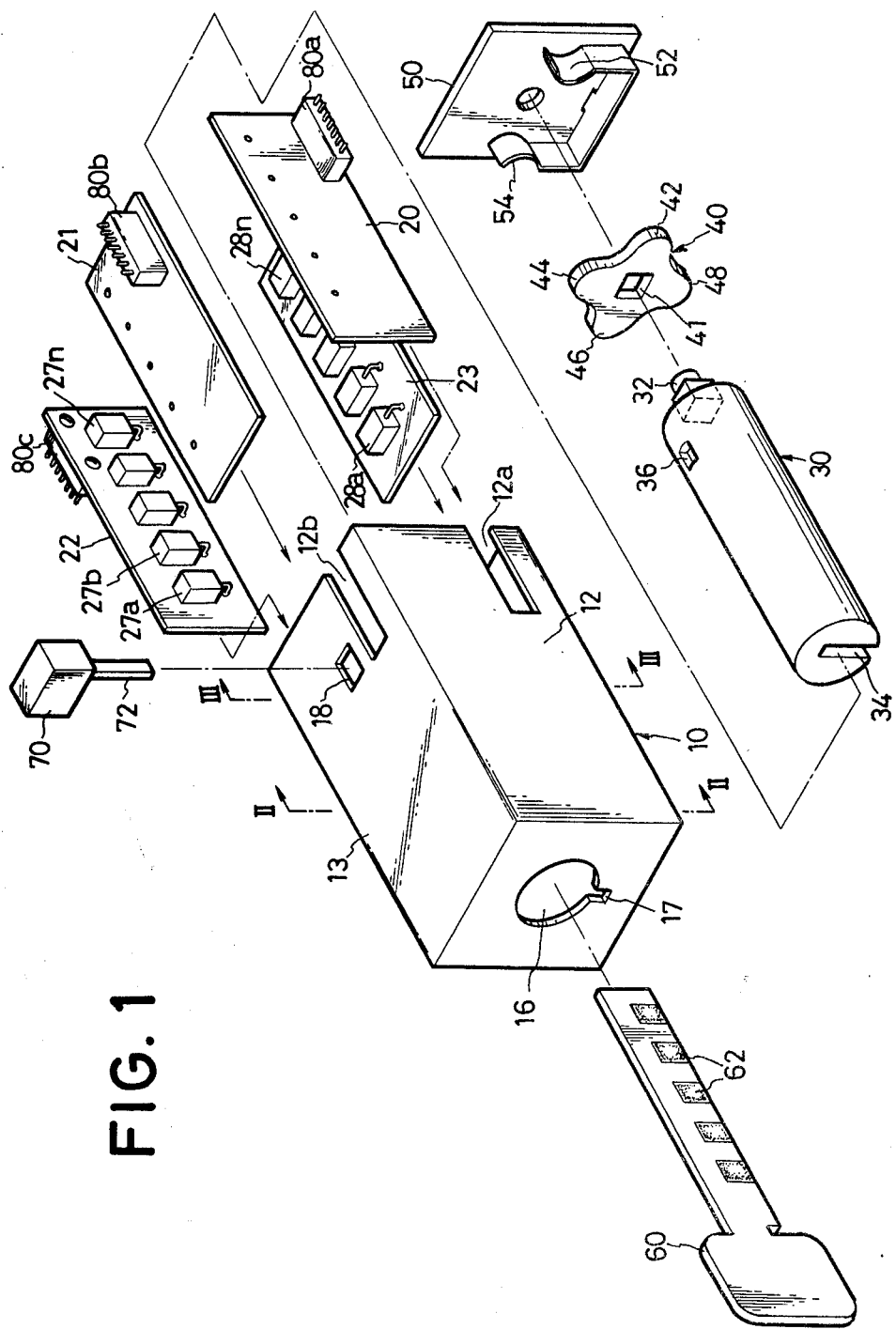
FIG. 1 is a perspective view showing components employed in a contactless digital key switch of the present invention.

Referring now to the drawings, and particularly to FIG. 1, there are shown components to be assembled to constitute a contactless digital key switch of the present invention, in which the numeral 10 designates a casing constructed in the form of 4-sided prism and formed centrally with a bore 16, and the numerals 20 through 23 printed circuit substrates each supporting a predetermined number of magnetic sensor chips such as Hole integrated circuit (Hole IC) chips longitudinally arranged thereon in spaced relation. For example, the printed circuit substrate 20 has thereon magnetic sensor chips 25a through 25n, the substrate 21 magnetic sensor chips 26a through 26n, the substrate 22 magnetic sensor chips 27a through 27n, and the substrate 23 magnetic sensor chips 28a through 28n. The numeral 30 indicates a rotary cylinder formed on its surface with a longitudinal groove 34 as a keyhole or entrance for an actuating key member to be described into the switching mechanism and having a projection 32 extending from its rear end. The numeral 60 designates an actuator key member having one or more permanent magnets 62 placed in its shank portion in spaced relation and in coded form for actuating the magnetic sensor chips in corresponding positions.

Figure 2:
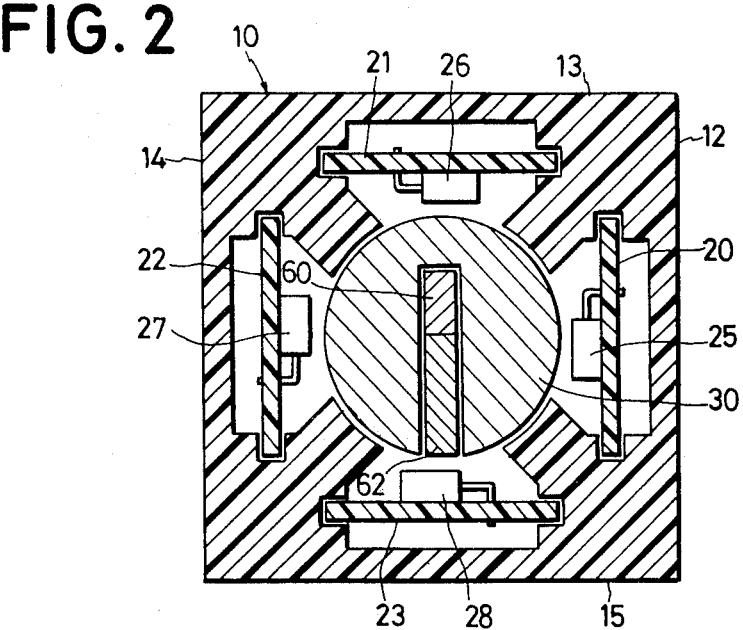
FIG. 2 is a transverse sectional view of the switch taken along the line A—A of FIG. 1 with the actuating key member inserted in the switching mechanism.
Figure 3:
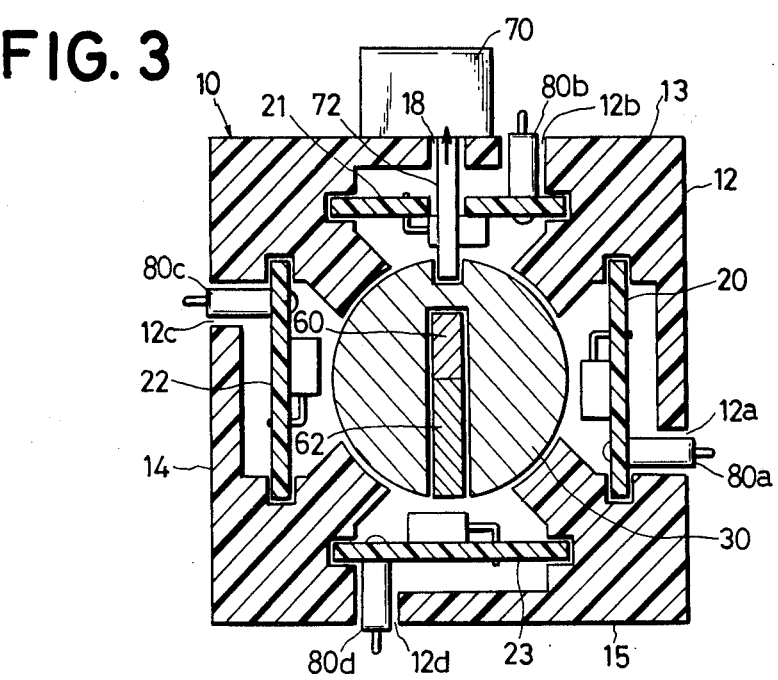
FIG. 3 is a transverse sectional view of the switch taken along the line B—B of FIG. 1.

As can be seen by reference to FIGS. 2 and 3, the printed circuit substrates 20 through 23 are disposed in a square pattern and supported in pockets formed in the respective walls 12 through 15 of the casing 10. The electrodes of the magnetic sensor chips placed on each of the printed circuit substrates are connected to output terminals (not shown) through a connector extending outwardly through a recess formed in the rear portion of the casing 10. For example, the electrodes of the magnetic sensor chips 25 through 28 supported on the respective printed circuit substrates 20 through 23 are connected to output terminals through connectors 80a through 80d extending outwardly through the recesses 12a, 13a, 14a and 15a formed in the walls 12 through 15 of the casing 10, respectively. The rotary cylinder 30 is rotatably placed in the center bore 16 of the casing 10.

The numeral 70 designates a solenoid operated lock mechanism attached to the outer surface 13 of the casing 10 and having a movable rod 72 which is normally inserted in a recess 36 formed in the rotary cylinder 30 through a hole 18 formed in the wall 13 of the casing 10 to restrict rotation of the rotary cylinder 30 within the casing 10 and is moved upward upon energization of the solenoid to permit rotation of the rotary cylinder 30.

The numeral 40 indicates a plate having outwardly extending fingers 42, 44, 46 and 48 which are snap-fitted and held in position under pressure between spring members 52 and 54 secured to the inner surface of a rear end cover 50 fixed to the rear open end of the casing 10. The projection 32 extending from the rear end of the rotary cylinder 30 has its root portion fitted in the center hole 41 of the plate 40 for rotation therewith and its free end rotatably supported in the center hole of the rear end cover 50. Thus, the rotary cylinder 30 can be held in position every time the rotary cylinder 30 is rotated through 90 degrees with a snap action provided by the fingers held between the spring members under pressure.

The operation of the contactless digital key switch of the present invention will now be described. When the actuating key member 60 is inserted into the switching mechanism through the groove 34 of the rotary cylinder 30 positioned as shown in FIGS. 2 and 3, the movable rod 72 is automatically moved upward to release the rotary cylinder 30 from its locked state and also the magnetic sensor chips 28 arranged on the printed circuit substrate 23 and facing to the permanent magnets 62 placed in coded form in the actuating key member 60 are actuated under magnetic fluxes thereof so as to provide a coded output signal. In this event, although the magnetic sensor chips 26 on the printed circuit substrate 21 face to the permanent magnets 62, they cannot be actuated because of the distance between the magnetic sensor chips 26 and the permanent magnets 62 sufficiently longer than the distance between the magnetic sensor chips 28 and the permanent magnets 62. A clockwise quater turning of the actuating key member 60 with a snap action causes the permanent magnets 62 to actuate the magnetic sensor chips 27 of the printed circuit substrate 22 facing to the permanent magnets 62. Similarly, an additional clockwise quater turning of the actuating key member 60 with a snap action causes actuation of the magnetic sensor chips 26 of the printed circuit substrate 21 and a further clockwise quater turning of the actuating key member 60 with a snap action causes actuation of the magnetic sensor chips 25 of the printed circuit substrate 20. When the actuating key member 60 is pulled out of the switching mechanism after a full rotation of the actuating key member 60, the movable rod 72 is moved downward to place the rotary cylinder 30 in its locked state.

From the foregoing, it will be evident that the present invention provides a unique contactless digital key switch for accomplishing the objects and advantages hereinstated. While the present invention has been described in conjunction with a specific embodiment thereof, it is evident that many alternatives, modifications and variations will be apparent to those skilled in the art. For example, a desired number of printed circuit substrates having thereon magnetic sensor chips and disposed in the form of polygon prism may be used instead of the four printed circuit substrates disposed in the form of 4-sided prism.

What is claimed is:

1. A contactless digital key switch comprising:
a plurality of printed circuit substrates each having a predetermined number of magnetic sensor chips longitudinally arranged thereon in spaced relation, said printed circuit substrates disposed in the form of polygon prism with said magnetic sensor chips facing inwardly;
an actuating key member having one or more permanent magnets longitudinally arranged therein in spaced relation and in coded form;
a rotary member adapted to receive said actuating key member and rotated with the same within said polygon prism defined by said printed circuit substrates; and
means drivingly connected to said rotary member for permitting rotation of said rotary member with a snap action and holding said rotary member in a position where said permanent magnets face to the corresponding magnetic sensor chips on one of said printed circuit substrates every time said rotary member is rotated by a predetermined angle;
whereby a coded output signal corresponding to said permanent magnets arranged in coded form can be provided every time said actuating key member is turned by said predetermined angle.

2. A contactless digital key switch as set forth in claim 1, wherein four printed circuit substrates each having a predetermined number of magnetic sensor chips are disposed in 4-sided prism.

3. A contactless digital key switch as set forth in claim 1, wherein said magnetic sensor chip comprises a Hole integrated circuit chip.

* * * * *